United States Patent
Chan

(10) Patent No.: US 12,172,230 B2
(45) Date of Patent: Dec. 24, 2024

(54) MECHANICAL MOUNT FOR STATIONARY, ACTIVELY-COOLED LENSES IN HIGH POWER LASER MATERIAL PROCESSING HEAD

(71) Applicant: II-VI Delaware, Inc, Wilmington, DE (US)

(72) Inventor: Danny Chan, Kleinmachnow (DE)

(73) Assignee: II-VI DELAWARE, INC., Wilmington, DE (US)

( * ) Notice: Subject to any disclaimer, the term of this patent is extended or adjusted under 35 U.S.C. 154(b) by 357 days.

(21) Appl. No.: 17/338,046

(22) Filed: Jun. 3, 2021

(65) Prior Publication Data

US 2022/0388094 A1 Dec. 8, 2022

(51) Int. Cl.
*B23K 26/06* (2014.01)
*B23K 26/70* (2014.01)
*G02B 7/02* (2021.01)

(52) U.S. Cl.
CPC ........ *B23K 26/0648* (2013.01); *B23K 26/703* (2015.10); *G02B 7/025* (2013.01); *G02B 7/026* (2013.01)

(58) Field of Classification Search
CPC .. B23K 26/0648; B23K 26/703; B23K 26/00; G02B 7/025; G02B 7/026
See application file for complete search history.

(56) References Cited

U.S. PATENT DOCUMENTS

| 11,169,357 B2 * | 11/2021 | Croglio, Jr. | ......... H01S 5/02253 |
| 2011/0097072 A1 * | 4/2011 | Gottwald | ............... G02B 7/007 |
| | | | 396/529 |

FOREIGN PATENT DOCUMENTS

| CN | 207255472 | * | 4/2018 |
| CN | 111496382 | * | 8/2020 |
| CN | 111496382 A | | 8/2020 |
| CN | 111531275 A | | 8/2020 |
| CN | 112518145 | * | 3/2021 |
| JP | S59116913 A | | 7/1984 |
| JP | S62263890 A | | 11/1987 |
| JP | H03165990 A | | 7/1991 |
| WO | WO-2020126557 A1 * | | 6/2020 |
| WO | WO-2020200814 A1 * | 10/2020 | ......... B23K 26/0648 |

* cited by examiner

*Primary Examiner* — Brian W Jennison
*Assistant Examiner* — Kristina J Babinski
(74) *Attorney, Agent, or Firm* — Blank Rome LLP

(57) ABSTRACT

A high-power laser processing head has precisely centered stationary lenses. The assembly of the lenses in the head can reduce contamination. The lens is affixed (soldered) in a ring-shaped highly precise mount, which ensures a high thermal conductivity of the joining interface. The mount and lens can be cleaned as a unit and inserted in a precisely manufactured receptacle of a housing module. A seal can provide sealing between an inner surface in the receptacles and a base surfaces of the mount. The modules has a groove around the diameter of the receptacle to catch any particles generated when inserting the lens mounts into the receptacle. The assembly is clamped into place by the next housing module. The lens is directly cooled by the module's body to mitigate contamination on the lens surface. During repairs, both lens and mount can be exchanged as a unit.

20 Claims, 5 Drawing Sheets

MECHANICAL MOUNT FOR STATIONARY, ACTIVELY-COOLED LENSES IN HIGH POWER LASER MATERIAL PROCESSING HEAD

BACKGROUND OF THE DISCLOSURE

A laser processing head, such as used for cutting or material processing, can provide a high-power laser beam of 10 kw and even up to 30 kW. Due to the working conditions, the high-power head is preferably resistant to contamination, which can damage the lenses in the head and can undermine the laser's performance.

In high power laser processing, lenses can be mounted in the processing head using a number of existing arrangements, including lens tubes, screw rings, and clamped mounts. For instance, a lens can be positioned directly in the head and can be held in place using a ring bushing that threads into place in the head. Alternatively, a lens can be mounted in a holder ring or tube, and the holder ring can thread into place in the head. A spring can be used to mount the lens in the holder ring in some instances.

Although effective, existing configurations may not be well-suited for some harsh working conditions, high-power laser energy, exposure to contamination, and other issues that can damage the optics in the head and undermine the laser's performance. To that end, the subject matter of the present disclosure is directed to overcoming, or at least reducing the effects of, one or more of the problems set forth above.

SUMMARY OF THE DISCLOSURE

A laser processing head according to the present disclosure is used to transmit a laser beam. The head comprises a plurality of modules being affixed together, and each of the modules defines an internal passage for passage of the laser beam through the modules. At least one of the modules defines a receptacle at one end of the internal passage. The receptacle has an internal wall and an inside face. For its part, the inside face has a central portion, which defines an opening of the internal passage and is surrounded by a recessed well. The at least one module further includes a mount surrounding a lens supported in the mount. The mount is inserted in the receptacle and has an external wall disposed adjacent the internal wall of the receptacle. The recessed well of the receptacle is configured to collect any particulate material produce during insertion of the mount in the receptacle.

According to the present disclosure, a laser processing head to transmit a laser beam comprise a plurality of modules being affixed together. Each of the modules defines an internal passage for passage of the laser beam through the module. A first of the modules defines a first receptacle in a first end of the first module. The first receptacle has a first internal wall and a first inside face. As before, the first inside face has a first central portion, which defines a first opening of the internal passage and being surrounded by a first recessed well. The first mount surrounds a first lens supported in the first mount. This first mount is inserted in the first receptacle and has a first external wall disposed adjacent the first internal wall of the first receptacle. The first recessed well of the first receptacle is configured to collect any particulate material produce during insertion of the first mount in the first receptacle. A second of the modules is affixed to the first end of the first module and encloses the first mount and the first lens in the first receptacle of the first module.

A method is disclosed of assembling a laser processing head to transmit a laser beam that is input along an optical axis of the head to a process zone. The method comprises: positioning a lens inside a mount; inserting the mount in a receptacle at one end of an internal passage of a first module; collecting any particulate material produced during insertion of the mount in the receptacle into a recessed well defined about a central portion on an inside face of the receptacle, the inside face defining an opening of the internal passage; and enclosing the mount and lens in the receptable by attaching a second module to the end of the first module, the second module having another internal passage positioned in communication with the lens.

The foregoing summary is not intended to summarize each potential embodiment or every aspect of the present disclosure.

DETAILED DESCRIPTION OF THE DISCLOSURE

Figures 1A, 1B:
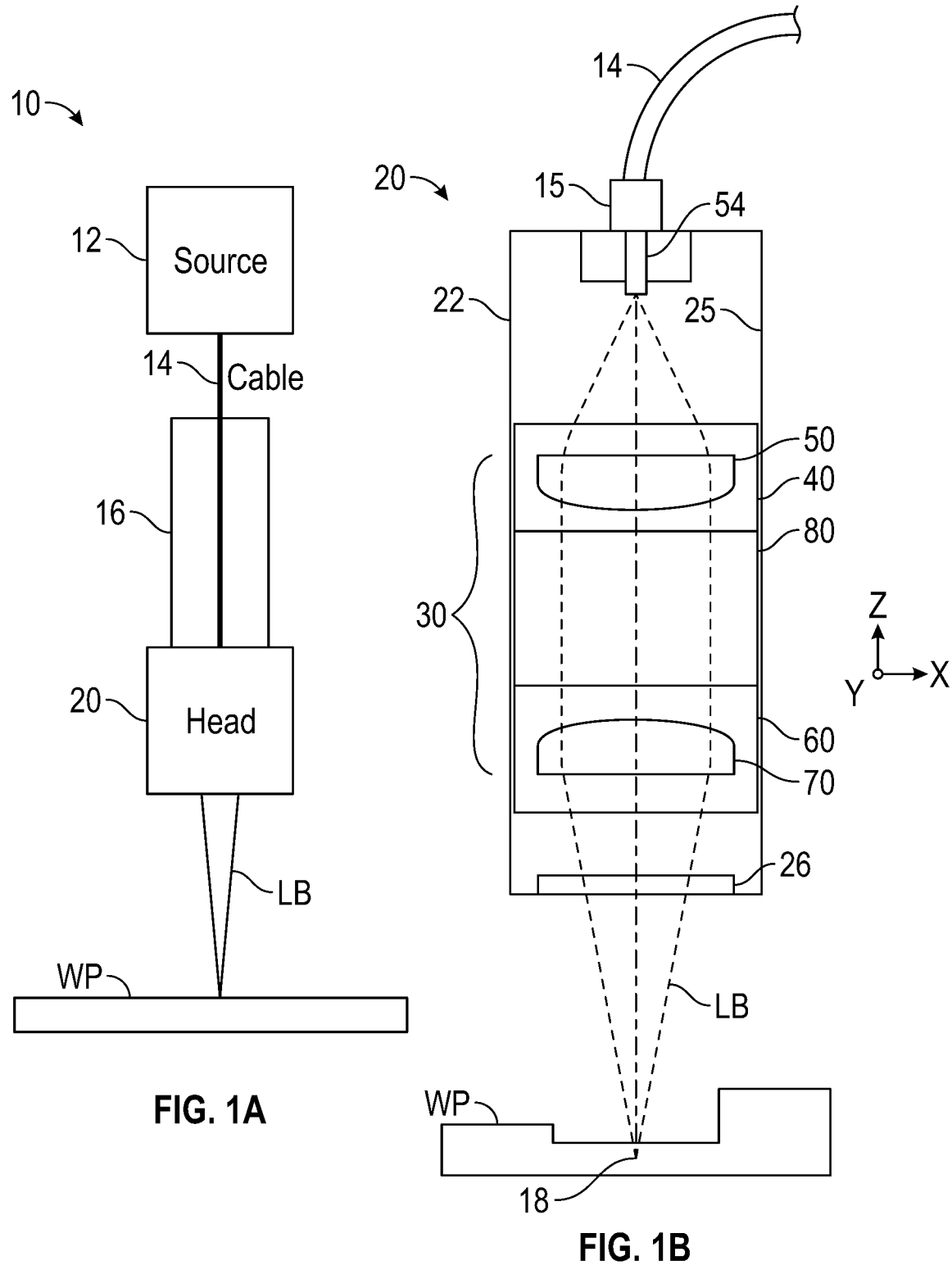
FIG. 1A illustrates a laser delivery system according to the present disclosure.
FIG. 1B schematically illustrates a laser processing head according to the present disclosure.

FIG. 1A illustrates a laser delivery system 10 according to the present disclosure. A laser source 12 generates high-power laser light that is propagated along a fiber optic cable 14 to a laser processing head 20. The laser source 12 can be any suitable multi-mode or a single-mode laser depending on the laser power required.

The laser processing head 20 can be moved relative to a workpiece WP and/or can have the workpiece WP moved relative to it. For example, the laser processing head 20 can be moved by a gantry system, robotic arm, or other apparatus 16 used in the art. Internally, the laser processing head 20 includes optics to focus the laser energy in a laser beam LB to the workpiece WP to achieve cutting, brazing, welding, additive manufacturing, or some other lasing process.

FIG. 1B schematically illustrates the laser processing head 20 according to the present disclosure. The laser processing head 20 includes a housing 22 for internal optics. Here, the housing 22 includes an arrangement of modules 30 that assemble together to make up the housing 22. A receiver 15 at one end of the housing 22 can couple to the laser cable 14, which conducts the laser light into the head 20. An output 26 at the other end of the housing 22 allows a focused laser beam LB to be emitted from the housing 22 for achieving the purposes of the lasing operation, such as welding, additive manufacture, cutting, etc. To protect the internal optics inside the housing 22, the output 26 can include a cover slide that acts as a transparent window to avoid contamination of the optical system.

During operation, the input 14 (e.g., a high-power laser delivery fiber) in the head 20 emits a high-power laser beam LB in the housing 22. In a general sense, one or more of the modules 30 has lenses that collimate and otherwise focus the laser beam LB to pass through the modules 30 and out the output 26 of the head 20. The beam LB is focused to a focal point or spot 18, and the laser beam LB then impinges on or near the workpiece WP or some other desired process zone.

The laser process head 20 can be constructed of several modules 30, which can be interchangeable and can be affixed together with various fixtures, such as mounting bolts, precision thread holes, flanges, etc. Each of the modules 30 defines an internal passage to transmit the laser beam LB input from the cable 14 along an optical axis of the head 20 to a process zone. Some possible modules 30 for the head 20 include a laser light cable receiver 40, any number of interface or adapter modules (not shown), a collimation module or a zoom collimation module 80 that can provide one or more magnifications and focal points, a focus forming module 60, a process monitoring module (not shown) to which viewing sensors can attach, a cover slide module (not shown) having a replaceable cover slide, a cross-jet module (not shown) to provide a cross-jet of gas, and the like.

As only diagrammatically shown in FIG. 1B, one module 40 is a laser light cable receiver module that has a lens element 50, and another module 60 is a focus forming module that has a focusing lens element 70. One or more intermediate modules 80 between them may or may not have a lens. In one configuration, the first lens element 50 of the receiver module 40 has a fixed distance from the focusing lens element 70 of the focusing module 60. In general, the lens element 50 can be a plane parallel window or other element.

The intermediate module 80 may be a collimation module having one or more lenses, at least one of which may be movable in the module to change the focal point 18 of the laser beam LB through wobble in X-Y plane, adjustment in the Z-axis, etc. For example, the laser processing head 20 can be used in a laser process in which the focal point 18 of the laser beam LB can be adjusted in the optical axis (i.e., Z-axis) relative to a workpiece WP for laser cutting, welding, soldering, surface treatment, tactile brazing, additive manufacturing processes, and the like.

Having an understanding of the processing head 20 and various modules 30, discussion now turns to further details of the modules and lens elements.

Figure 2:
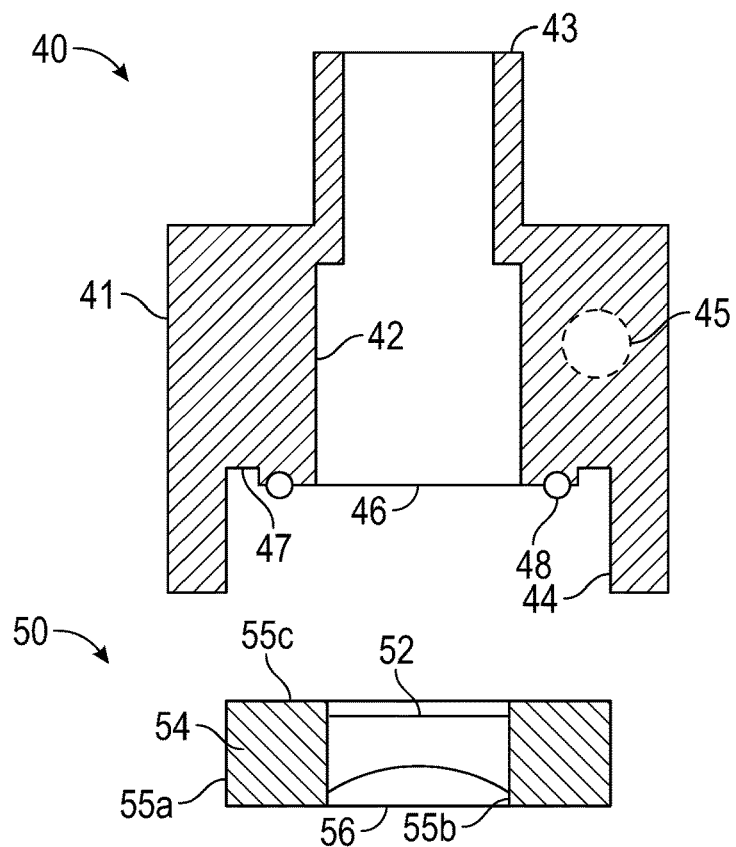
FIG. 2 illustrates a schematic view of one arrangement of a module, a mount, and a lens for the processing head according to the present disclosure.

FIG. 2 illustrates a schematic view of one arrangement of a module 40 and a lens element 50 having a lens 52 and a mount 54. This module 40 can be a laser light cable receiver module having an inlet 43 for connection of a laser light cable. The module 40 includes a body component 41, which can be made of appropriate material and can be constructed of one or more pieces as the case may be. The body component 41 defines an internal passage 42 therethrough for passage of the laser beam (not shown). A receptacle 44 is defined at one end of the internal passage 42. An inside face of the receptacle 44 has a central portion 46 that is surrounded (circumscribed) by a recessed (circumferential) well 47. The central portion 46 also defines an opening of the internal passage 42 for passage of the laser beam.

The mount 54 of the lens element 50 surrounds a lens 52 supported therein. The mount 54 can be composed of a suitable metal material, whereas the lens 52 can be composed of fused silica, sapphire, zinc sulfide, or any other appropriate material for the laser power used. Preferably, the lens 52 is composed of a material having high thermal conductivity, such as sapphire or zinc sulfide. In general, any material having an appropriate low absorption and having a high-power threshold to damage can be used. The lens element 50, module 40, and cooling arrangement 45 as disclosed can be beneficial for high thermal conductivity materials using for the lens 52 because the cooling actually affects the entire lens 52. Even if fused silica is used for the lens 52 that may not benefit from the cooling, the lens element 50 and other features of the arrangement still provide the benefits of reducing contamination and providing an aperture stop, among other benefits disclosed herein.

The lens 52 is preferably affixed in the mount 54 by soldering 56. Soldering the lens 52 in the mount 54 can reduce stress and can avoid outgassing of adhesives in vacuum applications. As preferred, the soldering 56 provides thermal conductivity between the mount 54 and the lens 52, which has advantages noted herein. Adhesive or other fixture can be used instead of the soldering 56 if desired. For example, high thermal conductivity adhesives may be used, provided that other characteristics are compatible with the implementation as well.

As shown, the mount 54 can be cylindrical having an external cylindrical sidewall 55a, an internal cylindrical sidewall 55b, and flat base surfaces 55c. If practical, closed shapes other than cylindrical can be used for the mount 54. In any event, the sidewalls 55a-b and surfaces 55c are preferably smooth and uniform, which allows for precise machining and polishing of the surfaces. This can reduce the likelihood of particles, debris, and the like being present on the sidewalls 55a-b and surfaces 55c when assembling the lens element 50 into the module 40.

During assembly, the mount 54 having the lens 52 affixed therein is inserted in the module's receptacle 44. The external sidewall 55a fits against an internal wall of the receptacle 44. During the insertion, any particulate material (e.g., debris, burs, flakes, etc.) produced between the internal wall 44 and the external sidewall 55a can collect in the recessed well 47 surrounding the central portion 46 of the receptacle 44. As an additional note, the internal sidewall 55b of the mount may have a smaller diameter than the internal passage 42 so that portion of the mount 54 can act as an aperture stop for the laser light when the head is assembled.

A seal 48 is disposed between the central portion 46 of the receptacle 42 and the base surface 55c of the mount 54. In general, the seal 48 can be disposed on either one or both of the portion 46 and surface 55c. In this example, the seal 48 is disposed on the central portion 46 about the opening of the internal passage 42 and is used to seal against the base surface 55c of the mount 54. The seal 48 is primarily a dust-proof seal to limit contamination. The seal 48 can be a compressible seal allowing the base surface 55c to mount adjacent the central portion 46. Any suitable type of sealing element can be used for the seal 48 and can be composed of metal, thermoplastic, or the like. To hide the seal 48 from stray light of the laser beam in the passage 42, the seal 48 can be recessed in one or both of the base surface 55c and central portion 48. Lips, ledges, and other features can be used as well. If required, the seal 48 can also be used to compensate for mechanical tolerances, e.g., to account for differences in size between the mount 52 and the receptacle 44. A seal (not shown) may also be provided on the other side of the mount 52. In this case, such a seal may be used mostly for tolerance compensation. If there is no seal provided at the interface between the mount 52 and the receptacle 44, then the surfaces should be polished to minimize friction and have a tight, dust-proof fit.

As further shown schematically, the module 40 can include a cooling arrangement 45 disposed in conjunction with the module's body component 41. As will be appreciated, various types of cooling arrangements can be used including internal/external conductors for liquid cooling. In general, the cooling arrangement 45, such as one or more thermoelectric cooling elements or water cooling arrangements, can be disposed on (or disposed in) the body component 41. As arranged, the cooling arrangement 45 associated with the body component 41 can be in direct thermal communication with the lens 52 via the mount 54 disposed in the receptacle 44. The soldering 56 between the lens 52 and the mount 54 can provide further direct thermal communication.

Preferably, the mount 54 is an integral, unitary component into which the lens 52 is affixed. Of course, other arrangements can be used. In general, for example, the mount 54 can be comprised of one or more rings holding the lens 52 therein. The lens 52 can be held between two rings, for example, that are attached together in an appropriate manner to hold the lens 52. In one configuration, the lens mount 54 can be a lens holder with a ledge and seal therein against which one side the lens 52 fits, and a spring ring can fit circumferentially in the lens holder to bias against the other side of the lens.

The external sidewall 55a of the mount 54 is preferably cylindrical and precisely machined to facilitate accurate placement of the lens element 50 into the receptacle 44. Shapes other than cylindrical couple can be used. However, threading is preferably not used and is not necessary on the external sidewall 55a, although it could be provided. An external seal, such as an O-ring can be disposed in groove about the external sidewall 55a of the mount 54 if desired to engage the internal wall of the receptacle 44.

Figure 3:
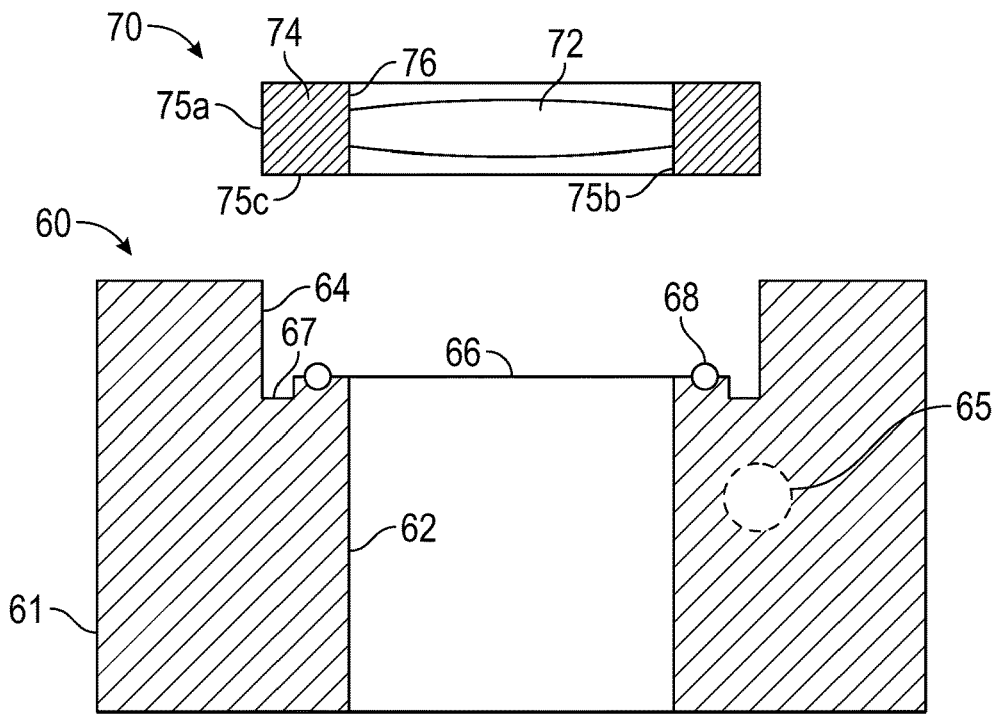
FIG. 3 illustrates a schematic view of another arrangement of a module, a mount, and a lens for the processing head according to the present disclosure.

FIG. 3 illustrates a schematic view of another arrangement of a module 60 and a lens element 70 having a lens 72 and a mount 74. This module 60 can be a focusing module for focusing the laser beam for output from the processing head (20).

Similar to the laser light cable module 40 of FIG. 2, this focusing module 60 in FIG. 3 includes a body component 61, which can be made of appropriate material and can be constructed of one or more pieces as the case may be. The body component 61 defines an internal passage 62 therethrough for passage of the laser beam. A receptacle 64 is defined at one end of the internal passage 62. An inside face of the receptacle 64 has a central portion 66, which is surrounded (circumscribed) by a recessed (circumferential) well 67. The central portion 66 also defines an opening of the internal passage 62.

The mount 74 of the lens element 70 surrounds a lens 72 supported therein. The mount 74 can be composed of a suitable metal material, whereas the lens 72 can be composed of fused silica, sapphire, zinc sulfide, or any other appropriate material for the laser power used. Preferably, the lens 72 is composed of a material having high thermal conductivity, such as sapphire or zinc sulfide.

The lens 72 is preferably affixed in the mount 74 by soldering 76. Soldering the lens 72 in the mount 74 can reduce stress and can avoid outgassing of adhesives in vacuum applications. As preferred, the soldering 76 provides thermal conductivity between the mount 74 and the lens 72, which has advantages noted herein. Adhesive or other fixture can be used instead of the soldering 76 if desired. For example, high thermal conductivity adhesives may be used, provided that other characteristics are compatible with the implementation as well.

As shown, the mount 74 can be cylindrical having an external cylindrical sidewall 75a, an internal cylindrical sidewall 75b, and flat base surfaces 75c. If practical, other closed shapes can be used for the mount 74. In any event, the sidewalls 75a-b and surfaces 75c are preferably smooth and uniform, which allows for precise machining and polishing of the surfaces. This can reduce the likelihood of particles, debris, and the like being present on the sidewalls 75a-b and surfaces 75c when assembling the lens element 70 into the module 60.

During assembly, the mount 74 having the lens 72 affixed therein is inserted in the module's receptacle 64. The external sidewall 75a fits against an internal wall of the receptacle 64. During the insertion, any particulate material (e.g., debris, burs, flakes, etc.) produced between the internal wall 64 and the external sidewall 75a can collect in the recessed well 67 surrounding the central portion 66 of the receptacle 64. It will be appreciated that the recessed well 67 can have a rectangular cross-section as shown or can have any other suitable shape based on manufacturing and other considerations. As an additional note, the internal sidewall 75b of the mount 74 may have a smaller diameter than the internal passage 62 so that portion of the mount 74 can act as an aperture stop for the laser light when the head is assembled.

A seal 68 is disposed between the central portion 66 of the receptacle 62 and the base surface 75c of the mount 74. In general, the seal 68 can be disposed on either one or both of the portion 66 and surface 75c. In this example, the seal 68 is disposed on the central portion 66 about the opening of the internal passage 62 and is used to seal against the base surface 75c of the mount 74. The seal 68 is primarily a dust-proof seal to limit contamination. The seal 68 can be a compressible seal allowing the base surface 75c to mount adjacent the central portion 66. Any suitable type of sealing element can be used for the seal 68 and can be composed of metal, thermoplastic, or the like. To hide the seal 68 from stray light of the laser beam in the passage 62, the seal 68 can be recessed in one or both of the base surface 75c and central portion 68. Lips, ledges, and other features can be used as well. If required, the seal 68 can also be used to compensate for mechanical tolerances, e.g., to account for differences in size between the mount 72 and the receptacle 64. A seal (not shown) may also be provided on the other side of the mount 72. In this case, such a seal may be used mostly for tolerance compensation. If there is no seal provided at the interface between the mount 52 and the receptacle 64, then the surfaces should be polished to minimize friction and have a tight, dust-proof fit.

As further shown schematically, the module 60 can include a cooling arrangement 65 disposed in conjunction with the module's body component 61. As will be appreciated, various types of cooling arrangements can be used including internal/external conductors for liquid cooling. In general, the cooling arrangement 65, such as one or more thermoelectric cooling elements or water cooling arrangements, can be disposed on (or disposed in) the body component 61. As arranged, the cooling arrangement 65 associated with the body component 61 can be in direct thermal communication with the lens 72 via the mount 74 disposed in the receptacle 64. The soldering 76 between the lens 72 and the mount 74 can provide further direct thermal communication.

Preferably, the mount 74 is an integral, unitary component into which the lens 72 is affixed. Of course, other arrangements can be used. In general, for example, the mount 74 can be comprised of one or more rings holding the lens 72 therein. The lens 72 can be held between two rings, for example, that are attached together in an appropriate manner to hold the lens 72. In one configuration, the lens mount 74 can be a lens holder with a ledge and seal therein against which one side the lens 72 fits, and a spring ring can fit circumferentially in the lens holder to bias against the other side of the lens.

The external sidewall 75a of the mount 74 is preferably cylindrical and precisely machined to facilitate accurate placement of the lens element 70 into the receptacle 64. Shapes other than cylindrical couple be used. However, threading is preferably not used and is not necessary on the external sidewall 75a, although it could be provided. An external seal, such as an O-ring can be disposed in groove about the external sidewall 75a of the mount 74 if desired to engage the internal wall of the receptacle 64.

As noted previously, a processing head (20) of the present disclosure can be constructed of one or more such modules 40, 60 and lens elements 50, 70. For example, FIG. 4 schematically illustrates modules 40, 60, 80 and lens elements 50, 60 of the present disclosed herein arranged as a portion of a processing head 20.

Figure 4:
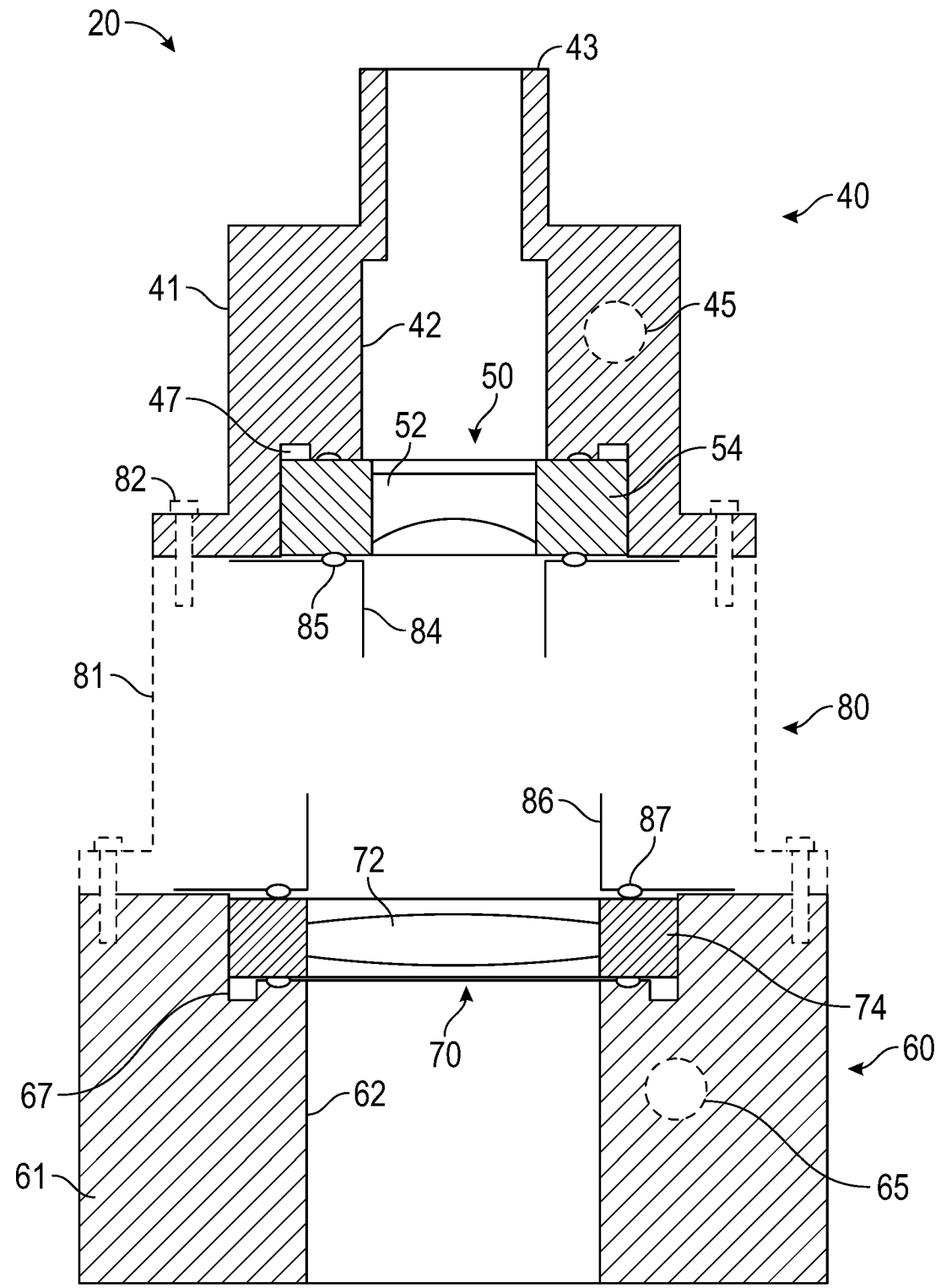
FIG. 4 schematically illustrates modules, mounts, and lenses of the present disclosure arranged as a portion of a processing head.

Here in FIG. 4, the head 20 includes the laser light cable module 40 of FIG. 2, an intermediate module 80, and the focusing module 60 of FIG. 3. As before, the laser light cable module 40 includes the lens element 50 with the mount 54 disposed in the receptacle 44. Any particulate produced during insertion of the lens element 50 into the receptacle 44 can remain collected in the well 47, and the lens mount 54 is sealed with the seal 48 about the central portion 46.

The module 40 is attached at one end to the intermediate module 80, which encloses the lens element 50 in the receptacle 44. Additional seals can be used as needed. As shown, the modules 40 and 80 can affix together using fixtures 82, such as bolts, flanges, bolt holes, and the like, arranged on the body components 41 and 81. This keeps the steps associated with assembly of these elements separate and apart from the components of the lens element 50 to reduce debris and contamination.

As before, the focusing module 60 includes the lens element 70 with the mount 74 disposed in the receptacle 64. Any particulate produced during insertion of the lens element 70 into the receptacle 64 can remain collected in the well 67, and the lens mount 74 is sealed with the seal 68 about the central portion 66.

The module 60 is attached at another end to the intermediate module 80, which encloses the lens element 70 in the receptacle 64. Additional seals can be used as needed. As shown, the modules 40 and 80 can affix together using fixtures 82, such as bolts, flanges, bolt holes, and the like arranged on the body components 41 and 81. This keeps the steps associated with assembly of these elements separate and apart from the components of the lens element 50 to reduce debris and contamination.

Although not shown, the intermediate module 80 as noted can have one or more lenses. Depending on the processing head 20, the lenses in the module 80 may be movable using actuators. The module 80 can be assembled as part of the processing head 20 by attaching the input module 40 and the focusing module 60 thereon. In general and as already mentioned, other modules (not shown) can be used on the head 20 and can attach together using arrangements of mounting bolts, flanges, and mounting holes.

The lens mount 54/74 is held in the receptacle 44/64 as schematically shown with precision machined surfaces. For instance, the body component 81 of the intermediate housing 80 can include a first shoulder 84 that abuts a flat base surface (55c) of the mount 54 in the upper module 40. A seal 85 can be provided and may be comparable to the seal 48 of the module 40. Likewise, the body component 81 can include a second shoulder 86 that abuts a flat base surface (75c) of the mount 74 in the lower module 60. A seal 87 can be provided and may be comparable to the seal 68 of the module 60.

Figure 5A:
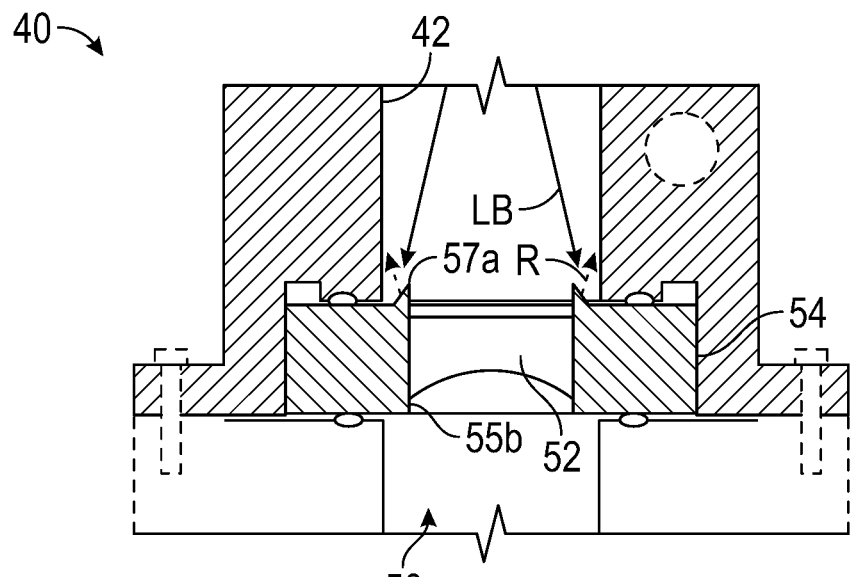
FIG. 5A schematically illustrates a lens mount acting as an aperture stop in a module of the preset disclosure.

As noted, the mounts disclosed here can act as an aperture stop for the laser beam passing through the assembled head. As one example, FIG. 5A schematically illustrates a lens mount 54 acting as an aperture stop in a module 40 of the preset disclosure. As noted, the internal sidewall 55b of the mount 54 may have a smaller diameter than the module's internal passage 42 so that an inner edge of the mount 54 can act as an aperture stop for the laser beam LB passing through the assembled head. Further, a lip 57a, a ledge, a ramp, or a raised feature can be disposed circumferentially about the top edge of the mount's opening and can cut off and reflect the peripheral light of the laser beam LB as dispersed light R. If suited to the implementation, another module, such as focusing module (60), may also have (or may alternatively have) such a configuration for an aperture stop.

Figure 5B:
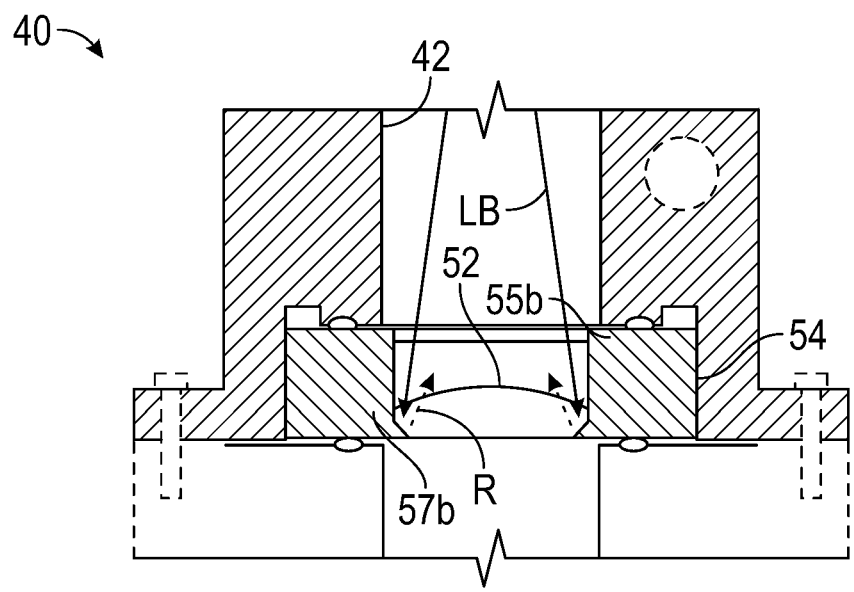
FIG. 5B schematically illustrates another lens mount acting as an aperture stop in a module of the preset disclosure.

In another example, FIG. 5B schematically illustrates another lens mount 54 acting as an aperture stop in a module 40 of the preset disclosure. Again, the internal sidewall 55b of the mount 54 may have a smaller diameter than the module's internal passage 42 so that an inner edge of the mount 54 can act as an aperture stop for the laser beam LB passing through the assembled head. Further, a lip 57b, a ledge, a ramp, or a projecting feature can be disposed circumferentially inside the mount's opening and can cut off and reflect the peripheral light of the laser beam LB as dispersed light R. This configuration can be suited for a negative lens 52 and may offer a better aperture stop because the negative lens 52 will further disperse the laser power. If suited to the implementation, another module, such as focusing module (60), may also have (or may alternatively have) such a configuration for an aperture stop. Moreover, both this lip 57b and the other lip (57a of FIG. 5A) can be used together if appropriate.

Figure 6A:
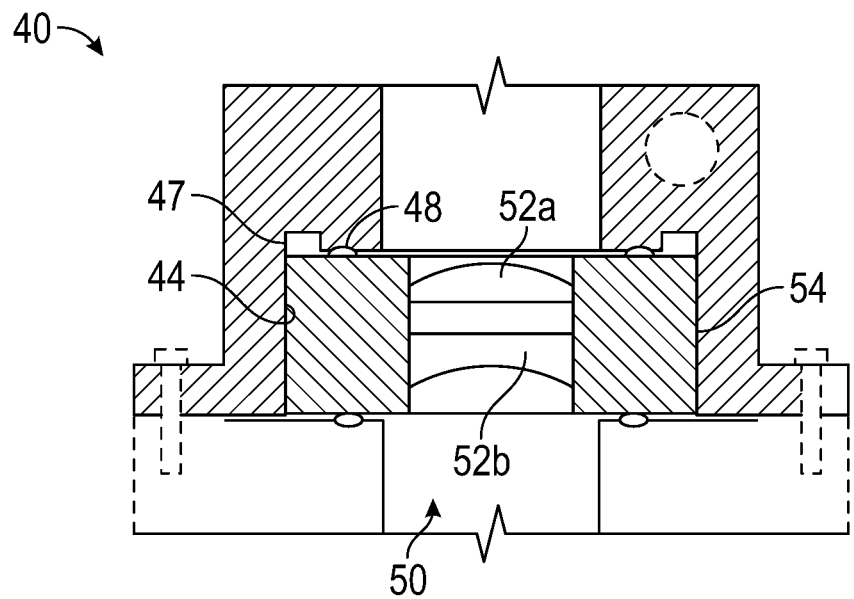
FIG. 6A schematically illustrates a lens mount of the preset disclosure mounted in a receptacle and holding more than on lens therein.

In previous examples, one lens disposed in one mount is installed in a receptacle toward one end of a module. It will be appreciated that each ends of a module can have a receptacle to hold a lens disposed in a mount. Moreover, it will be appreciated that a given mount 54 disposed in a receptacle 44 of a module 40, such as the one shown in FIG. 6A, can have more than one lens 52a-b disposed therein. The polished receptacle 44, the well 47, the seal 48 that provide the sealing/particle catching features can be the same as noted herein.

Figure 6B:
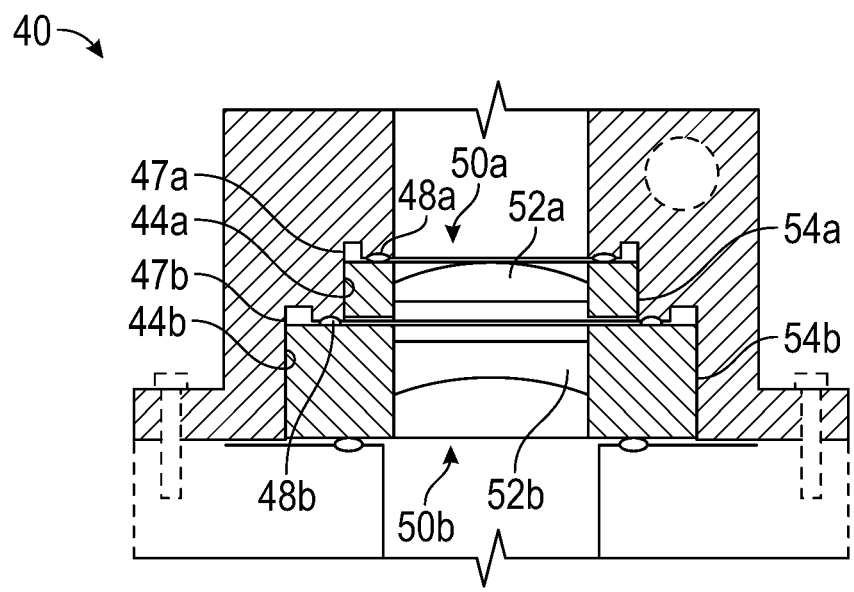
FIG. 6B schematically illustrates additional lens mount of the preset disclosure stacked in a receptacle of a module.

In yet another alternative as shown in FIG. 6B, mounts 54a-b having separate lenses 52a-b can be stacked next to each other in a receptacle of a module 40. The receptacle can be stepped having a narrower portion 44a and a wider portion 44b. The lens mounts 54a-b can having different diameters to nest together. Each portion 44a-b of the receptacle can have a polished inside wall, a well 47a-b, and a seal 48 as before to provide the sealing/particle catching features.

These and other variations can be combined together depending on the optical characteristics needed for an implementation.

It will be appreciated that the figures of the present disclosure are schematic in nature and do not necessarily present the precision, machining, and tolerances desired for an implementation. Moreover, the lenses disposed in the mounts can be any suitable shape of lens (e.g., biconcave, plano-convex, biconcave, positive meniscus, negative meniscus, etc.) for collimating, focusing, and the like, as required by the implementation.

In summary as disclosed herein, the lenses 52, 72 can be affixed (soldered) in a ring-shaped highly precise mounts 54, 74, which ensures a high thermal conductivity of the joining interface (high thermal conductivity adhesives may also be used, provided that other characteristics are compatible with the application as well). The mounts 54, 74 and lenses 52, 72 can be cleaned as a unit.

The lens elements 50, 70 are inserted in precisely manufactured receptacles 44, 64, and seals 48, 68 provide sealing between the inner surfaces 46, 66 in the receptacles 44, 64 and the base surfaces of the mounts 54, 74. The modules 40, 60 also have groove 47, 67 around the diameter of the receptacles 44, 64 to catch any particles generated when inserting the lens mounts 52, 72 into the receptacles 44, 64. The assembly is clamped into place by the next housing module. The lenses 52, 72 are actively cooled by the body components 41, 61. During repairs, both lenses 52, 72 and mounts 54, 74 can be exchanged as a unit.

During operation, one or more of the lens elements 52, 72 may become damaged due to contamination or the like. The module 40, 60 having the mount 54, 74 and the lens 52, 72 can be replaceable on the head 20 as a unit. Operators can detach the respective module 40, 60 having the damaged lens 52, 72. In one technique, a new module 40, 60 and lens element 50, 70 can then be attached to the other parts of the head 20. This allows for the compromised module 40, 60 having the damaged lens 52, 72 to be directly swapped out for a pre-assembled replacement module 40, 60 already having a new lens element 50, 70. This simplifies the repairs of the processing head 20 so that operators do not need to make tedious repairs on site.

Of course, an alternative technique may involve placing a replacement lens element 50, 70 in the existing module 40, 60 from which the damaged element 50, 70 has been removed so that module 40, 60 can be reassembled on the head 20. Either way, the lens element 50, 70 having the lens 52, 72 and ring-shaped mount 54, 74 can be cleaned as a unit and can be stored as a clean sub unit for use when needed.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A laser processing head configured to transmit a laser beam, the laser processing head comprising:
    modules that are configured to be fixed together, each of the modules defining a portion of an internal passage that the laser beam is configured to be transmitted through, the internal passage extending along an optical axis of the laser processing head; and
    a mount that supports a lens, the mount comprising an external wall, wherein
    at least one module of the modules comprises a receptacle at one end of the internal passage of the at least one module, the receptacle comprising:
        a first internal wall extending along the optical axis and defining the portion of the internal passage of the at least one module;
        a second internal wall extending along the optical axis of the laser processing head and radially offset outwardly from the first internal wall, the second internal wall being configured to abut against the external wall of the mount when the mount is inserted into the receptacle;
        an inside face that faces a direction along which the optical axis of the laser processing head extends, the inside face defining an opening of the internal passage of the at least one module; and
        a well that is recessed along the optical axis of the laser processing head relative to the inside face, the well comprising an extension of the second internal wall and defining a cavity in the receptacle,
    the mount is configured to be inserted into the receptacle, and
    the receptacle and the mount are configured such that, when the mount is inserted into the receptacle with particulate material between the external wall of the mount and the second internal wall of the receptacle, the cavity collects the particulate material and the mount closes the cavity and isolates the cavity from the internal passage.

2. The laser processing head of claim 1, wherein the lens is made of at least (i) fused silica, (ii) sapphire, (iii) zinc sulfide, or (iv) material having a thermal conductivity of at least as great as sapphire or zinc sulfide.

3. The laser processing head of claim 1, further comprising a seal between the inside face of the receptacle and a base surface of the mount.

4. The laser processing head of claim 1, wherein the second internal wall of the receptacle and the external wall of the mount each comprise a polished surface.

5. The laser processing head of claim 1, further comprising a cooling arrangement in conjunction with the at least one module and in direct thermal communication with the lens via the mount.

6. The laser processing head of claim 1, wherein the mount comprises a ring that is fixed around the lens.

7. The laser processing head of claim 6, comprising a thermally-conductive adhesive that fixes the lens to the mount.

8. The laser processing head of claim 6, comprising a solder that fixes the lens to the mount.

9. The laser processing head of claim 1, wherein the at least one module, the mount, and the lens are replaceable together as a unit.

10. The laser processing head of claim 1, wherein the mount and the lens are replaceable together as a unit on the at least one module.

11. The laser processing head of claim 1, further comprising fixtures comprising mounting bolts and mounting holes that fix the modules together.

12. The laser processing head of claim 1, wherein an inner edge of the mount defines an aperture stop for the laser beam passed therethrough.

13. A laser processing head configured to transmit a laser beam, the laser processing head comprising:

modules that are configured to be fixed together, each of the modules defining a portion of an internal passage that the laser beam is configured to be transmitted through, the internal passage extending along an optical axis of the laser processing head; and a mount that supports a lens, the mount comprising an external wall, wherein:

a first module of the modules comprises a receptacle in an end of the first module, the receptacle comprising:

a first internal wall extending along the optical axis and defining the portion of the internal passage of the first module;

a second internal wall extending along the optical axis of the laser processing head and radially offset outwardly from the first internal wall, the second internal wall being configured to abut against the external wall of the mount when the mount is inserted into the receptacle;

an inside face that faces a direction along which the optical axis of the laser processing head extends, the inside face defining an opening of the internal passage of the first module; and a well that is recessed along the optical axis of the laser processing head relative to the inside face, the well comprising an extension of the second internal wall and defining a cavity in the receptacle, the mount being configured to be inserted into the receptacle, and the receptacle and the mount are configured such that, when the mount is inserted into the receptacle with particulate material between the external wall of the mount and the second internal wall of the receptacle, the cavity collects the particulate material and the mount closes the cavity and isolates the cavity from the internal passage, and a second module of the modules is fixed to the end of the first module and encloses the mount and the lens in the receptacle of the first module.

14. The laser processing head of claim 13, wherein the receptacle of the first module comprises a seal between the inside face of the receptacle of the first module and a base surface of the mount.

15. The laser processing head of claim 13, further comprising a cooling arrangement in conjunction with the first module and in direct thermal communication with the lens via the mount.

16. The laser processing head of claim 13, wherein:

the mount is a first mount and the lens is a first lens, the laser processing head comprises a second mount that supports a second lens, the second mount comprising an external wall, a second module of the modules comprises a receptacle in an end of the second module, the receptacle of the second module comprising:

a first internal wall extending along the optical axis of the laser processing head and defining the portion of the internal passage of the second module;

a second internal wall extending along the optical axis of the laser processing head and radially offset outwardly from the first internal wall of the second module, the second internal wall being configured to abut against the external wall of the second mount;

an inside face that faces another direction that opposes the direction along which the optical axis of the laser processing head extends, the inside face of the receptacle of the second module defining an opening of the internal passage of the second module; and a well that is recessed along the optical axis of the laser processing head relative to the inside face of the receptacle of the second module, the well comprising an extension of the second internal wall of the receptacle of the second module and defining a cavity in the receptacle of the second module, the second mount is configured to be inserted into the receptacle of the second module, and the receptacle of the second module and the second mount are configured such that, when the second mount is inserted into the receptacle of the second module with second particulate material between an external wall of the second mount and the second internal wall of the receptacle of the second module, the cavity collects the second particulate material and the second mount closes the cavity and isolates the cavity from the internal passage.

17. A method of assembling a laser processing head that is configured to transmit a laser beam input along an optical axis of the laser processing head to a process zone, the method comprising:

positioning a lens inside a mount;

inserting the mount into a receptacle of a first module at an end of an internal passage of the first module, the receptacle comprising a first internal wall extending along the optical axis and defining the internal passage of the first module, the receptacle further comprising a second internal wall extending along the optical axis of the laser processing head and radially offset outwardly from the first internal wall, the second internal wall being configured to abut against an external wall of the mount when the mount is inserted into the receptacle, the receptacle further comprising a well that is recessed along the optical axis of the laser processing head relative to an inside face of the receptacle of the first module that faces a direction along which the optical axis of the laser processing head extends, the well comprising an extension of the second internal wall and defining a cavity in the receptacle;

collecting, in the cavity, particulate material produced during the insertion of the mount into the receptacle of the first module and closing the cavity with the mount to isolate the cavity from the internal passage; and attaching a second module to the end of the first module to enclose the mount and the lens in the receptacle of the first module, the second module defining an internal passage in optical communication with the lens.

18. The method of claim 17, further comprising sealing between the inside face of the receptacle and a base surface of the mount with a seal.

19. The method of claim 17, further comprising arranging a cooling arrangement in conjunction with the first module and in direct thermal communication with the lens via the mount.

20. The method of claim 17, wherein the mount is a first mount and the lens is a first lens, the method further comprising at least one of:

detaching the first module and the second module, replacing the first lens and the first mount as a unit with a second mount that supports a second lens in the first module, and reattaching the first module to the second module; or detaching the first module and the second module, replacing the first module and the first lens and the first mount as the unit with a third module with a third mount that supports a third lens supported inserted into a receptacle of the third module, and attaching the third module to the first module.

* * * * *